S. N. OLSEN.
CASTER.
APPLICATION FILED SEPT. 18, 1908.
968,790.
Patented Aug. 30, 1910.
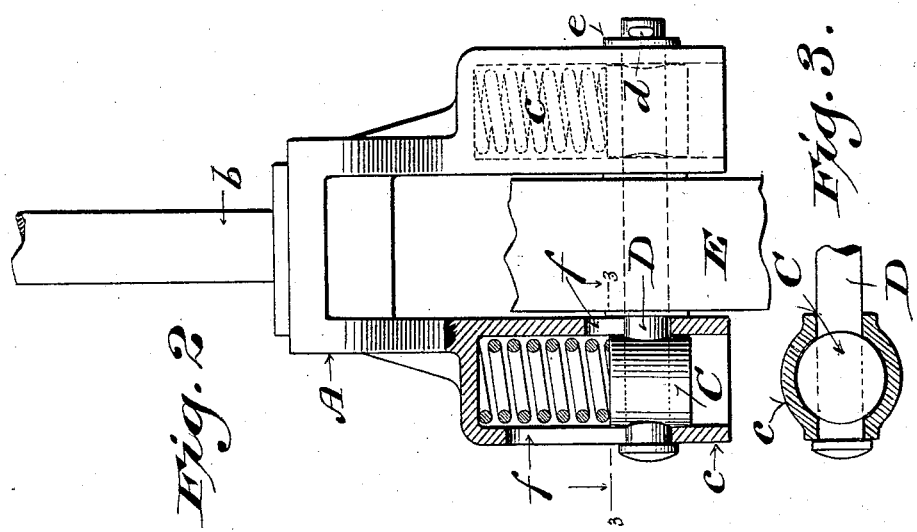
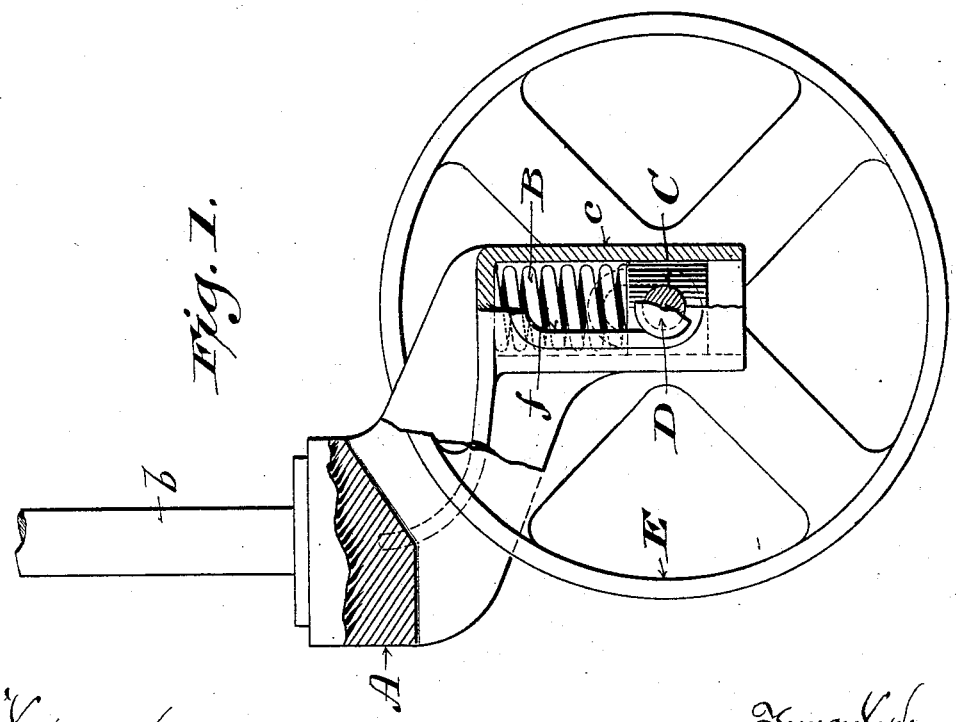

UNITED STATES PATENT OFFICE.

SAMUEL N. OLSEN, OF MILWAUKEE, WISCONSIN, ASSIGNOR TO SPRING BEARING TRUCK COMPANY, OF MILWAUKEE, WISCONSIN.

CASTER.

968,790.  Specification of Letters Patent. Patented Aug. 30, 1910.

Application filed September 18, 1908. Serial No. 453,656.

*To all whom it may concern:*

Be it known that I, SAMUEL N. OLSEN, a citizen of the United States, and resident of Milwaukee, in the county of Milwaukee and State of Wisconsin, have invented certain new and useful Improvements in Casters; and I do hereby declare that the following is a full, clear, and exact description thereof.

My invention consists in what is herein shown, described, and pointed out in the claim; is object being to provide simple, economical spring-bearing casters for use in connection with various machines, vehicles and implements.

Figure 1 of the accompanying drawings represents a side elevation of a spring-bearing caster in accordance with my invention partly broken away; Fig. 2, a rear elevation of same partly broken away, and Fig. 3, a horizontal section of a fragment of the caster on the plane indicated by line 3—3 in Fig. 2.

Referring by letter to the drawings A indicates the yoke of my improved caster, this yoke being preferably cast upon a vertical axial stem $b$. Each of the parallel branches of the yoke is provided with an outer hollow lateral extension $c$ constituting a housing having vertical side slots $f$, and in sliding engagement with each housing is a stemless bearing-block C that supports a spiral-spring B confined in the same housing. An axle D engages the bearing blocks C and has play in the side slots of the housings, said blocks being preferably cylindrical and the bores of said housings likewise. The axle is shown headed at one end, and its other end is provided with an aperture for a key-pin $d$ between which and the adjacent branch terminal of the aforesaid yoke a washer $e$ is interposed, but the detail of means for securing the axle in working position may be indefinitely varied. The axle has its vertical play in the side slots $f$ of the fork-branch terminals of the caster-yoke and extends through registering apertures provided in the bearing-blocks.

In practice, the yield of the caster-yoke to load thereon is against the resistance of the spring B, whereby the load is cushioned, and said spring is of any desirable stiffness.

I claim:

In a caster, the combination of a vertical axial stem, a yoke rigid with the stem and having parallel branches thereof each provided with an outer hollow extension constituting a housing vertically slotted at the sides, a bearing block in sliding engagement with each housing, a spiral-spring supported on each bearing-block in the housing for the same, an axle engaging the housing-slots and bearing-blocks, and a wheel on the axle between the branches of the yoke.

In testimony that I claim the foregoing I have hereunto set my hand at Milwaukee in the county of Milwaukee and State of Wisconsin in the presence of two witnesses.

SAMUEL N. OLSEN.

Witnesses:
S. J. HANSEN,
N. E. OLIPHANT.